United States Patent [19]

Kunert

[11] 3,735,218

[45] May 22, 1973

[54] DEVICE FOR THE COMPARISON OF TWO PULSE-SERIES FREQUENCIES

[75] Inventor: Heinz-Peter Kunert, Tangstedt, Germany

[73] Assignee: U.S. Philips Corporation, New York, N.Y.

[22] Filed: May 14, 1971

[21] Appl. No.: 143,564

[30] Foreign Application Priority Data

Aug. 8, 1970 Germany....................P 20 39 557.7

[52] U.S. Cl...................................328/134, 307/233
[51] Int. Cl.............................H03k 5/20, H03k 9/06
[58] Field of Search..............................307/232, 233; 328/109, 110, 133, 134

[56] References Cited

UNITED STATES PATENTS 3,092,736 6/1963 Ernyei..............................328/134 X
3,233,180 2/1966 Eddy....................................328/134
3,354,398 11/1967 Broadhead, Jr.....................328/133

*Primary Examiner*—John Zazworsky
*Attorney*—Frank R. Trifari

[57] ABSTRACT

A plurality of interconnected AND-gates and flip-flops provide a first output pulse in response to an input pulse series having a frequency higher than a fixed frequency source and a second output in response to a measuring pulse series having a frequency lower than the fixed frequency source. Inputs to the device include a clock pulse signal and a timing pulse signal, both synchronized with the fixed frequency pulse source.

6 Claims, 4 Drawing Figures

Patented May 22, 1973 3,735,218

2 Sheets-Sheet 1

INVENTOR.
HEINZ PETER KUNERT

BY
[signature]
AGENT

DEVICE FOR THE COMPARISON OF TWO PULSE-SERIES FREQUENCIES

The invention relates to a device for producing the difference frequency of two pulse series, in which the first pulse series is derived from the pulses of a timing-pulse series, for example by repeated suppression. In the device the second pulse series is independent from this timing-pulse series. The difference signal output is each time applied as pulses to one of two outputs of the device, one output being positive and the other being negative.

Difference producers of this kind are required, for example, in digital ratio control devices in which the various desired quantities are pulse series, derived from a timing-pulse series by suppression or dividing. For reasons of control technical processing it is favorable if the comparison between the actual and the desired value is effected within the time raster of the timing-pulse series. If the actual frequency exceeds the timing-pulse frequency, deviation pulses of the correct polarity must, additionally be produced between the timing pulses in order to avoid loss of information. Two embodiments of difference producers are described in the V.D.E. Book series vol. 8 "Digital Signalverarbeitung in der Regelungstechnik" on pages 215–216 and on page 231. These known difference producers do not satisfy the above requirements completely.

In one known difference producer the output pulses are selected with the correct sign *via* two gate stages. The gate stages are controlled by the complementary outputs of a trigger which is controlled by the input pulses. So long as a pulse appears alternately on both inputs of this device, this trigger is triggered at every pulse, so that thereby no pulses appear on the outputs of the device. It is only if $n+1$ pulses appear on one input without a pulse appearing in between on the other input, that $n$-pulses are applied to the corresponding output. Owing to the mode of operation this device represents in a control technical sense an element in which one pulse is suppressed. Moreover, the deviation pulses are not obtained as required within the time raster of a timing-pulse series.

In a second difference producer, known as a difference gate, the pulses of a desired and actual pulse series are intermediately stored in auxiliary stores. The stored pulses are then taken over in the main store synchronously with a scanning pulse series, after which the desired difference signals are formed by means of coincidence detection. This difference producer is expensive and cannot be extended for the case where the pulse series frequency exceeds the frequency of the scanning pulse series.

The invention provides a simple device for frequency difference production, in which the said limitations are eliminated and which efficiently satisfies in the simplest manner possible, the aforementioned conditions for application in digital controllers. The invention is characterized in that means are provided by which a pulse of the second pulse series, synchronized with a clock pulse, produces a pulse on the positive output if it occurs simultaneously with a pulse of the timing-pulse series (which is also synchronized with the clock pulse) in the absence of a pulse of the first pulse series. The invention furthermore includes logic means for setting a store if the pulse of the second pulse series does not occur simultaneously with a pulse of the timing-pulse series. The next pulse of the timing-pulse series, in the absence of a pulse of the first pulse series, causes the logic means to produce with the said store a signal on the positive output and erases the store. The logic means also causes a pulse of the first pulse series to produce a pulse on the negative output, if the store is not set and in the absence of a pulse of the second pulse series.

The clock pulse here serves as a kind of auxiliary timing pulse and generally has a frequency which is very much higher than the timing-pulse frequency.

If the series frequency of the second pulse series exceeds the timing-pulse frequency, so that the store is still set when the next pulse of the second pulse series appears, a pulse is produced directly on the positive output. This pulse can no longer appear within the time raster of the timing pulse.

If the store is still set and a further pulse of the second pulse series appears simultaneously with a pulse of the timing-pulse series, there is the risk that this further pulse of the second pulse series is lost. This is due to the fact that the set store is first interrogated with the timing pulse and then is erased. Consequently, for this case a further store is provided which stores or delays the further pulse of the second pulse series until the contents of the first store have been processed. In addition the pulses of the second pulse series can be synchronized with the aid of a third store.

In order that the invention may be readily carried into effect, some embodiments thereof will now be described in detail, by way of example, with reference to the accompanying diagrammatic drawings, in which.

Figure 2:
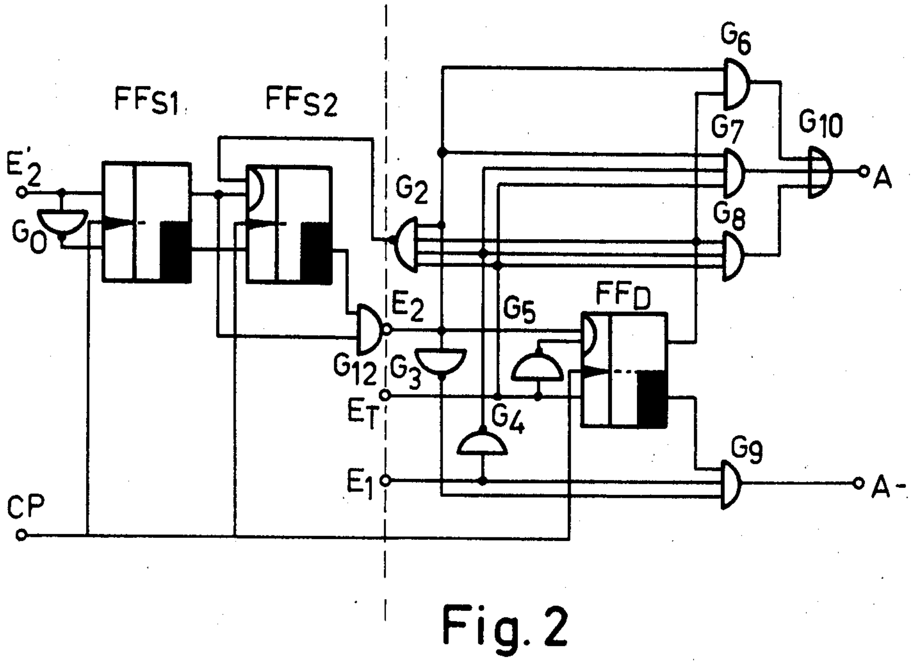
FIG. 2 shows a device according to FIG. 1 with additional synchronization of one of the input signals.
Figure 1A:
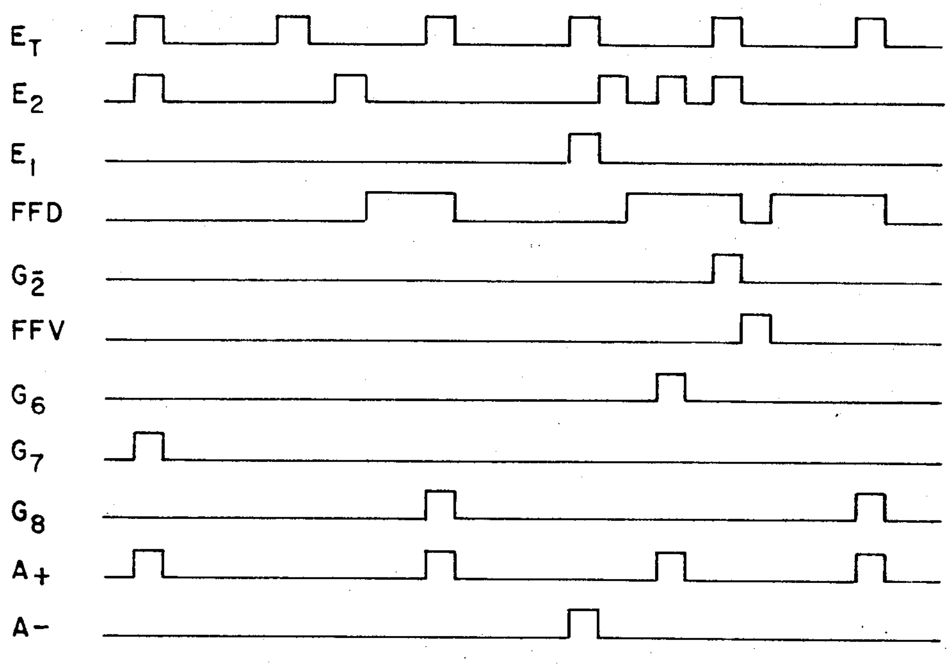
FIG. 1*a* is a pulse diagram showing the input signals of the device and output signals of each AND-gate and flip-flop as well as the output signals of the device as shown in FIG. 1.
Figure 2A:
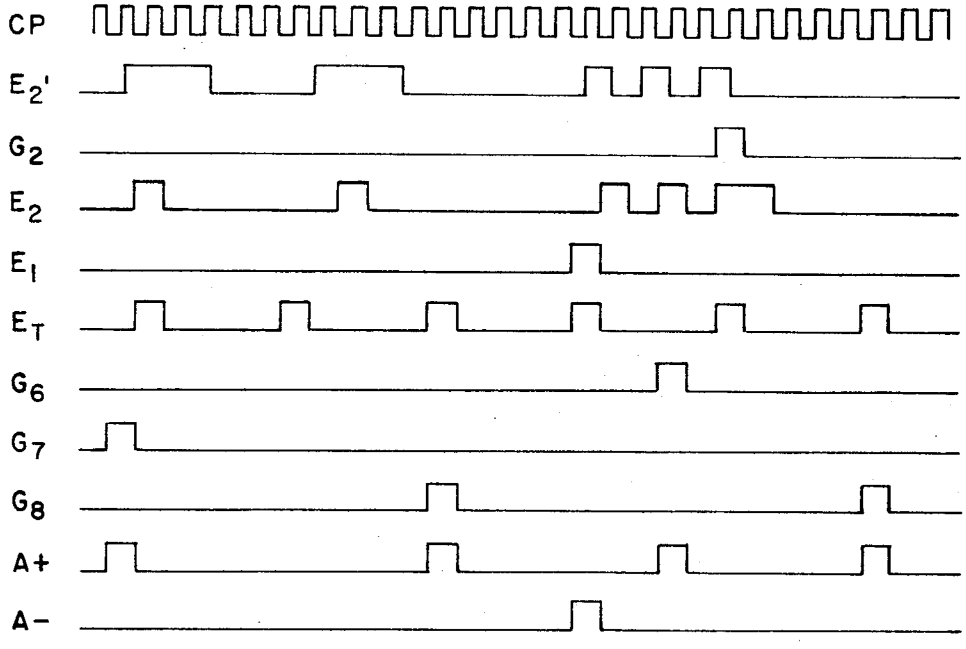

FIG. 2*a* shows a pulse diagram of the input, output signals of the device as well as the output of each AND-gate.

Figure 1:
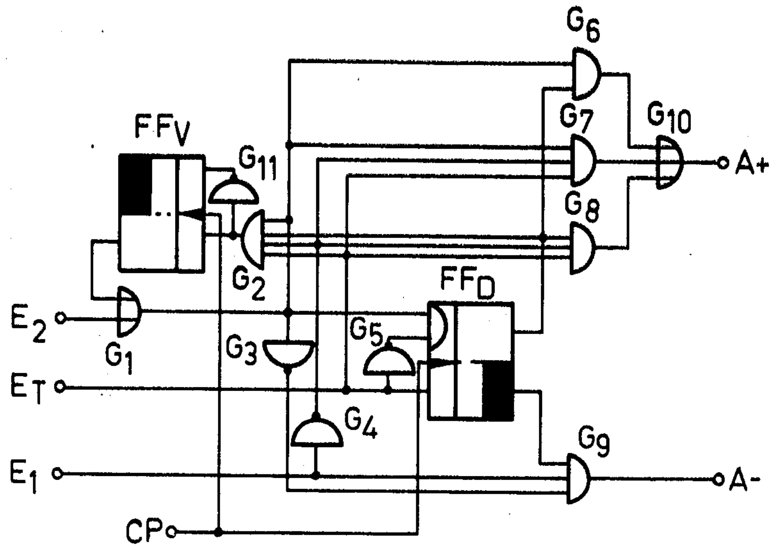
FIG. 1 shows a device according to the invention for synchronized input signals.

In FIG. 1, the input $E_2$ for the synchronized pulses of the second pulse series independent from the timing pulse, leads to an OR-gate $G_1$, the other input of which is controlled by the 1-output of a bistable trigger $FF_V$, having preparation inputs and one trigger input. The 1-output of such a trigger carries a signal if a signal is present on the setting preparation input and a pulse appears on the trigger input connected to the clock pulse input. The signal on the 1-output of flip-flop $FF_D$ disappears again and appears on the 0-output of the trigger if a signal appears on the erasing preparation input is present and the trigger input receives a pulse. The control of the preparation inputs of the bistable trigger $FF_V$, however, will be explained hereinafter. Normally, the trigger $FF_V$ is in a 0 state, so that the 1-output does not carry a signal and the pulses of the second pulse series applied to the input $E_2$ appear only on the output of the OR-gate $G_1$.

The output of the OR-gate $G_1$ then leads *inter alia* to one input of the AND-gate $G_7$, the other inputs of which are connected to the input $E_T$ for the timing pulse and, *via* an inverter $G_4$, to the input $E_1$ for the first pulse series. This first pulse series is derived from the timing pulse by division or, in the case of division ratios not involving integers, for example by suppression, so that the pulses of the first pulse series always appear together with a pulse of the timing-pulse series. Moreover, the pulses of all three pulse series are so synchronized with the clock pulse that they always have a duration of only one clock pulse period.

If a pulse appears on the input $E_2$ and hence on the output of the OR-gate $G_1$ and a timing pulse appears simultaneously therewith on input $E_T$, but no pulse appears on the input $E_1$, all three inputs of the AND-gate $G_7$ receive a signal so that also on the output of the AND-gate $G_7$ a signal arises. The signal from AND-gate $G_7$ is applied *via* the OR-gate $G_{10}$ to the positive output A+, thus indicating that the input $E_2$ has received one pulse more than the input $E_1$.

However, often a pulse on the input $E_2$ does not coincide with a timing pulse on the input $E_T$. In this case, the AND-condition of the gate preceding the preparation input for the setting of the bistable trigger $FF_D$ is satisfied, and the next clock pulse sets this trigger. The 1-output of the bistable trigger $FF_D$ then carries a signal which, however, cannot produce an output signal on the positive output A+ because the other signal conditions are not fulfilled. It is only when a 1-output from $FF_D$ coincides with the timing pulse input $E_T$ and no pulse is present on the input $E_1$ that the first pulse series that the three conditions for the AND-gate $G_8$ are fulfilled, thereby producing a signal on the positive output A+. This output signal appears as required within the time raster of the timing pulse even though the pulse on the input $E_2$ may arrive at an arbitrary instant.

As the timing pulse input $E_T$ leads directly to the preparation input for erasing the bistable trigger $FF_D$, this trigger is erased by the next clock pulse.

When a pulse arrives on the input $E_1$ for the first pulse series, which as has been explained always coincides with a pulse of the timing-pulse series, and the bistable trigger $FF_D$ has been set, the conditions for the AND-gate $G_8$ have not been fulfilled and no output signal is produced as a pulse has arrived on each of the two inputs $E_1$ and $E_2$ so that the difference is zero. However, if the bistable trigger $FF_D$ is not set upon the arrival of a pulse of the first pulse series, and if no pulse of the second pulse series arrives at the same time either, which is detected by the invertor $G_3$, the conditions for the AND-gate $G_9$ are fulfilled and signal is produced on the negative output A−, as now input $E_2$ has received one pulse less than input $E_1$.

All possibilities for the simultaneous occurrence of the pulses of the first and the second pulse series have thus been taken into account and a signal is produced on the positive output A+ or the negative output A− respectively within the time raster of the timing pulse, only if there actually is a difference between the number of pulses of the two pulse series.

In many applications it is possible, however, that the pulse series frequency of the second pulse series is even higher than the frequency of the timing-pulse series so that more than one pulse of the second pulse series occurs between two timing pulses. The additional AND-gate $G_6$ is provided therefor. As described, the first pulse of the second pulse series sets with the subsequent clock pulse the bistable trigger $FF_D$. With the next pulse the other condition of the AND-gate $G_6$ is then also fulfilled, so that a signal is directly produced on the positive output A+. This signal is no longer within the time raster of the timing pulse. Further pulses of the second pulse series also directly produce output signals until a timing pulse appears again and produces with the set trigger $FF_D$ an output signal on the positive output, if a pulse of the first pulse series does not appear simultaneously, and erases the trigger $FF_D$ in all cases.

One difficulty then arises if with the bistable trigger $FF_D$ being set a pulse of the second pulse series appears simultaneously with a timing pulse, but no pulse of the first pulse series appears. In that case the conditions of both the AND-gate $G_6$ and the AND-gate $G_8$ are fulfilled simultaneously. These pulses are combined by the OR-gate on the positive output A+, and appear as one signal. In order to prevent the loss of a pulse in this way, this last pulse of the second pulse series is delayed or prolonged by the additional bistable trigger $FF_V$ bistable trigger $FF_V$ also has preparation inputs for setting and erasing, and also a trigger input connected to the clock pulse input CP. The above-mentioned combination of input signals is detected by the AND-gate $G_2$, the output of which is connected to the preparation input for setting, and *via* an inverter to the preparation input for erasing bistable trigger $FF_V$. As soon as this combination of input pulses occurs, the bistable trigger is set by the next clock pulse so that also the bistable trigger $FF_D$ is erased. As the 1-output of the bistable trigger $FF_V$, which now carries a signal, is connected to an input of the OR-circuit $G_1$, this signal also appears on the output of the OR-circuit so that the last pulse on the input E2 appears in a prolonged or delayed manner. With the subsequent clock pulse this signal sets the bistable trigger $FF_D$ as in the meantime the timing pulse on the input $E_T$ has disappeared. For the same reason the bistable trigger $FF_V$ is erased again by this clock pulse because the conditions for the AND-gate $G_2$ are no longer all fulfilled. Thus, the inverter $G_{11}$ excites the preparation input for erasing bistable trigger $FF_V$. In this way no pulse of the second pulse series can be lost.

It was assumed in the preamble that the pulses of the second pulse series, which are independent from the timing-pulse series, are synchronized with the clock pulse. This synchronization can be effected in known manner by means of two bistable triggers. If this synchronization stage is designed accordingly the function of the above-mentioned additional bistable trigger $FF_V$ is realized at the same time. This is shown in FIG. 2, the rest of the circuit being unchanged with respect to FIG. 1.

The input $E_2'$ for the non-synchronized pulses of the second pulse series, leads to the preparation input for the setting of a first bistable trigger $FF_{S1}$. As soon as a pulse appears on this input, the trigger $FF_{S1}$ is set by the next clock pulse. As the subsequent bistable trigger $FF_{S2}$ is still in the rest position, the conditions for the AND-gate $G_{12}$ are fulfilled and a pulse which is synchronized with the clock pulse appears on point $E_2$. The next clock pulse sets the second bistable trigger $FF_{S2}$, assuming that the signal on the other input of the AND-gate for the preparation input for setting the second bistable trigger $FF_{S2}$ is present. When the trigger $FF_{S2}$ is set, however, the conditions for the AND-gate $G_{12}$ are no longer fulfilled so that the pulse on point $E_2$ is only one clock pulse period long, independent from how long the pulse is present on input $E_2'$.

When this input pulse disappears again, the first bistable trigger is excited *via* the invertor $G_0$ of the preparation input for erasing, so that the next clock pulse erases trigger $FF_{S1}$. The following clock pulse erases the second bistable trigger $FF_{S2}$, no output signal appearing on the input AND-gate thereof.

If the bistable trigger FFD is set and a pulse appears on input $E_2'$ shortly before a timing pulse appears on input $E_T$, so that the output pulse of the gate $G_{12}$ appears simultaneously with the timing pulse, and no pulse is present on input $E_1$, all conditions for the AND-gate $G_2$ are fulfilled. However, since in this case an AND-gate with subsequent inverter is concerned, the output does not carry a signal. Consequently, the AND-gate in front of the preparation input for setting the bistable trigger $FF_{S2}$ is blocked, so that this trigger remains in the rest position when the next clock pulse is applied, and the AND-gate $G_{12}$ supplies a signal to the output thereof. With the exception of the case, when the timing pulse disappears so that the conditions for the AND-gate $G_2$ are no longer fulfilled, the next clock pulse sets the bistable trigger $FF_{S2}$, so that the signal on the output of the AND-gate G12, stored with this clock pulse in the bistable trigger $FF_D$, disappears. In this way the synchronized pulse of the second pulse series is prolonged or delayed in the synchronizing stage at minimum additional expense.

What is claimed is:

1. A device for producing a difference frequency between pulses of a first pulse series having a fixed frequency and a second pulse series having a frequency independent from the first pulse series, comprising first circuit means for receiving the pulses of the first pulse series, second circuit means for receiving pulses of the second series, third circuit means for receiving timing pulses synchronized with the pulses of the first pulse series, and clock pulse circuit means for receiving clock pulses synchronized with the pulses of the timing pulse signal, a first AND-gate means connected to the first circuit means, the second circuit means and the third circuit means for providing a first output for the device in response to the concurrence of pulses from the second pulse series and timing pulse series and the absence of a pulse from the first pulse series, a bistable storage means having a first stable state in response to a pulse on a first input line and having a second stable state in response to a pulse on a second input line, second gate means connected to the third circuit means and to the second circuit means and having an output connected to the first input line of the bistable storage means for setting said storage means to a first stable state in response to the concurrence of a pulse from the first pulse series and the absence of a pulse from the timing pulse series, the second input of the storage means connected to the third circuit means for setting the storage means to a second stable state in response to the presence of a pulse from the timing pulse series, third gate means connected to the storage means and to the first and third circuit means for providing a first device output pulse in response to the concurrence of a pulse from the timing pulse series, the first state of the storage means and an absence of a pulse from the first pulse series, fourth AND-gate means connected to the storage means and to the first and second circuit means for providing a second device output pulse in response to the concurrence of a pulse from the first pulse series, the absence of a pulse from the second pulse series and the second state of the storage means.

2. A device as claimed in claim 1, further comprising a fifth AND-gate means connected to the storage means and to the second circuit means for providing a first device output pulse in response to the concurrence of the first state of the storage means and a pulse from the second pulse series.

3. A device as claimed in claim 2 wherein the storage means comprises a bistable trigger, wherein the first and second input lines of the bistable trigger are preparation inputs and wherein the storage means further comprises a trigger input connected to the clock pulse circuit means the storage means being triggerable only during the occurence of a clock pulse.

4. A device as claimed in claim 3, further comprising a second storage means having a first and second input line and triggerable to a first stable state in response to an input pulse on the first input line thereof and triggerable to a second stable state in response to a pulse on the second input line thereof, sixth gate means connected to the second circuit means, the first storage means, the first circuit means, and the third circuit means for setting the second storage means to a first stable state in response to the concurrence of pulses from the second pulse series and timing pulse series, the absence of a pulse from the first pulse series and the first state of the first storage means, the second storage means being triggerable to a second stable state in response to the absence of a pulse on the first input line thereof, and means connecting the output of the second storage means to the second input circuit.

5. A device as claimed in claim 4, wherein the second storage means comprises a bistable trigger, wherein the first and second input lines of the second storage means are preparation inputs and wherein the second storage means further comprises a trigger input connected to the clock pulse circuit, the second storage means triggerable only in response to the concurrence of a pulse on a preparation input and a clock pulse.

6. A device as claimed in claim 3, wherein the second input circuit means comprises a first auxiliary flip-flop triggerable to a first state in response to the concurrence of a clock pulse and the absence of a pulse from the second series of pulses and triggerable to a second stable state in response to the concurrence of a clock pulse and the presence of a pulse from the second series of pulses, a second auxiliary flip-flop triggerable to a first stable state in response to the concurrence of a clock pulse, a feed-back pulse and the first stable state of the first auxiliary flip-flop, the second auxiliary flip-flop being triggerable to a second stable state in response to the concurrence of a clock pulse and the second stable state of the first auxiliary flip-flop, sixth AND-gate means connected to the first and second auxiliary flip-flops for providing the output of the second circuit means in response to the concurrence of the first stable state of the first auxiliary flip-flop and the second stable state of the second auxiliary flip-flop, and a first NAND-gate means for providing the feed-back pulse in response to the absence of a pulse on the output of the second circuit means, or the zero state of the first flip-flop, or a pulse from the first pulse series, or the absence of a timing pulse.

* * * * *